U S006771457B2

(12) United States Patent
Flaherty et al.

(10) Patent No.: US 6,771,457 B2
(45) Date of Patent: Aug. 3, 2004

(54) TOGGLE-PROTRUSION LOCKOUT MECHANISM FOR CARTRIDGE LIBRARY

(75) Inventors: Steven Martin Flaherty, Tucson, AZ (US); Shawn Michael Nave, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 10/210,372

(22) Filed: Aug. 1, 2002

(65) Prior Publication Data

US 2004/0021978 A1 Feb. 5, 2004

(51) Int. Cl.⁷ .............................................. G11B 15/68
(52) U.S. Cl. ...................................................... 360/92
(58) Field of Search .................. 360/92, 96.5; 720/631, 720/639, 646, 647, 730, 731

(56) References Cited

U.S. PATENT DOCUMENTS

| 5,053,902 | A | | 10/1991 | Kato ........................... 360/96.5 |
|---|---|---|---|---|
| 5,999,363 | A | | 12/1999 | Seo ............................. 360/96.5 |
| 6,141,180 | A | * | 10/2000 | Smith .......................... 360/96.5 |
| 6,320,722 | B1 | * | 11/2001 | Tsuchiya et al. ............. 360/96.5 |
| 2003/0058747 | A1 | * | 3/2003 | Smith et al. .................... 369/1 |

* cited by examiner

Primary Examiner—George J. Letscher
(74) Attorney, Agent, or Firm—Antonio R. Durando; Durando Birdwell & Janke, PLC

(57) ABSTRACT

A two-lever toggle mechanism operates in conjunction with a conventional toggle bracket of an I/O station to prevent the incorrect loading of a DLT cartridge into a dedicated pass-through slot. A rotating front lever includes a leading protrusion facing the slot and a front wing that cooperates with the toggle bracket to prevent its closure when an incorrectly loaded cartridge is present in the slot. A rotating rear lever similarly incorporates a trailing protrusion facing the slot and a shank slidably coupled to an elongated groove in the front lever, such that the two levers rotate together. Therefore, the trailing protrusion provides an additional safeguard to ensure that only a DLT cartridge that is placed correctly into the slot permits the closure of the toggle bracket.

33 Claims, 5 Drawing Sheets

TOGGLE-PROTRUSION LOCKOUT MECHANISM FOR CARTRIDGE LIBRARY

BACKGROUND OF THE INVENTION

1. Field of the Invention

This invention relates generally to automated data-storage libraries and, in particular, to a lockout mechanism for ensuring that a data cartridge is inserted correctly into the receiving cell of the input/output station of a library.

2. Description of the Related Art

The portability of magnetic tape cartridges makes it possible to store them in readily accessible multi-cell libraries, so that large amounts of data can be saved and retrieved at will using automated equipment. When, for example, a particular cartridge is required for use in a computer's I/O device, the unit is retrieved by a robot from the cell where it has been stored in a library and it is automatically loaded for processing.

Cartridges are initially placed into libraries manually through input/output stations which consist of stacks of individual through-slots with an exterior opening adapted to receive a cartridge of a predetermined size and configuration. For example, FIG. 1 illustrates an IBM 3584 Automated Library that incorporates an I/O station 10 with a cartridge 12 inserted half-way into a receiving through-slot 14. Each slot has also an interior opening (not shown) through which the cartridge is removed by a robot for automated placement in a library storage cell or magazine. The picker mechanism through which each cartridge is transferred includes gripper arms that hold the cartridge and guide it in and out of the I/O station, and similarly in and out of the library cell, computer peripheral, or other device being used. The cartridges have retaining features that permit gripper arms to latch on to the cartridge by means of appropriate locating and gripping notches or equivalent structural features built into the case of the cartridge. Accordingly, commercial cartridge formats are standardized to provide uniformity of construction and interchangeability of operation between cartridges produced by different manufacturers.

In operation, each cartridge 12 is initially inserted manually by an operator into a slot 14 of a receiving cell in the I/O station. The cartridge must be positioned correctly in order for the gripper arms to be able to retrieve it from the other side of the cell. Thus, only one of the eight possible orientations of a conventional cartridge is acceptable for the picker mechanism inside the library and any other orientation of the cartridge would be incorrect and cause a failure of the automated system. The problem is worse with libraries that operate with multiple types of cartridges and that, therefore, provide an even smaller ratio of correct options. If two formats are used, for example, only one out of sixteen possible alternatives is correct.

Two of the cartridge formats most widely used currently around the world are the so called DLT (digital linear tape) and LTO (linear tape open) formats, each characterized in detail by corresponding ECMA (European Computer Manufacturers Association) 286 and 319 standards. Accordingly, IBM's 3584 Library accommodates both types of cartridge and is equipped with corresponding I/O units with cells selectively dedicated to one cartridge or the other. Each cartridge format features prescribed structural attributes adapted to function with conforming standard features in the automated mechanisms of a corresponding drive, picker and library system. For example, a typical DLT format cartridge 20, such as IBM®'s DLTtape® IV Cartridge illustrated in FIG. 2, is characterized by a hinged door 22 on the front side 14 of the cartridge. When the DLT cartridge is inserted into a drive, a stationary device penetrates a gap 26 in the door hinge 28 and presses against a spring-loaded latch 30 to automatically release the door 22 and swing it open toward the front of the cartridge. As a result, the tape's leader inside the cartridge (not seen) can be accessed by the drive's mechanism. As the door 22 opens, the door hinge 28 rotates inwardly toward the right side 32 of the cartridge. Accordingly, the right side of the DLT cartridge 20 features a progressively deepening cavity 34 designed to accommodate the door hinge 28 when the door 22 is fully open. The shallower portion of the cavity 34 also features two ribs 36.

Thus, the right side 32 of the DLT cartridge contains several pronounced structural features that distinguish it from all other sides, as well as from every side of the LTO cartridge. When a DLT cartridge is inserted in an I/O station by an operator, it must be placed top-side up and with the door 22 facing the exterior of the station, as illustrated in FIG. 3; otherwise, the library picker cannot properly grab and retain the cartridge, and the picker may become disabled causing the automated library to go off-line and the stored data to become inaccessible. This possibility of failure is unacceptable in today's world of uninterrupted-service demand. Therefore, it would be very desirable to have a mechanism that prevents the incorrect placement of a DLT cartridge or the placement of another cartridge into the receiving slots of an I/O station designed to handle only DLT cartridges.

U.S. Pat. No. 6,141,180, issued to Smith, describes a pivoting lockout that prevents the incorrect placement of a DLT cartridge into a receiving device, such as a tape magazine, a library or a mail slot. The lockout consists of a hinged member with a leading and a trailing edge protruding into the sleeve to be occupied by the cartridge when it is placed in the receiving device. Therefore, the cartridge can be successfully introduced into the device only one way, when the side containing the cavity is facing the hinged lockout member. Because of its configuration and placement, the lockout member is able to clear the ribs 36 and to fit into the cavity 34 of the DLT cartridge (refer to FIG. 2 above) as the cartridge is pushed into the sleeve of the receiving device. Thus, the lockout of the invention prevents the complete insertion of the DLT cartridge unless it is oriented correctly.

The Smith lockout device is not designed for a pass-through sleeve of the type present in I/O stations. It is only concerned with ensuring that the cartridge is placed correctly in a receiving cell from which it is to be extracted later in reverse direction. Accordingly, the door hinge 28 could not clear the two protruding edges of the lockout if the cartridge were to be extracted in pass-through fashion from the interior side of an I/O station. The present invention provides a new design for a lockout mechanism that overcomes this problem and is therefore suitable for use in input/output stations.

BRIEF SUMMARY OF THE INVENTION

The primary objective of this invention is a lockout mechanism that allows the complete introduction of a DLT cartridge into an I/O station only when it is properly oriented.

Another objective of the invention is a lockout mechanism that permits the pass-through extraction of the DLT cartridge from the interior side of the I/O station by an automated library picker.

A specific goal of the invention is a lockout mechanism that also prevents the full insertion of an LTO cartridge into the DLT I/O cell of an IBM 3584 Library.

Finally, an important goal of the invention is a lockout mechanism that can be easily incorporated into the structure of existing I/O stations of automated libraries.

Therefore, according to these and other objectives, the invention consists of a two-lever toggle mechanism designed to operate in conjunction with the conventional toggle bracket of I/O stations in automated libraries. Each lever of the toggle mechanism is mounted on one of the two side posts that support each receiving slot of a conventional I/O station. The front lever is rotatably mounted on the front post and includes a leading blade or structural protrusion facing the slot and a front wing that cooperates with the toggle bracket provided to control access to the I/O station. When the toggle bracket is closed, access to the I/O station is prevented by the encroachment of the front edge of the bracket over the opening of the I/O slots. In such closed position, the leading protrusion of the front lever rests inside the slot of the cartridge. When the toggle bracket is opened to permit manual access to the I/O station to either insert or remove cartridges, the toggle bracket causes the front lever to rotate to an open position whereby the leading protrusion is removed from the slot of cartridge. As a result, the leading protrusion does not obstruct the introduction of any appropriately sized cartridge into the slot. When an LTO cartridge or a DLT cartridge in the wrong position is introduced into the slot, the counter-rotation of the front lever required to permit the closure of the toggle bracket is blocked by the substantially flat side of the cartridge that faces the leading protrusion and prevents its penetration into the slot. Therefore, the I/O station cannot be closed. When, instead, a DLT cartridge is introduced in the correct orientation, a cavity in the side of the cartridge is able to accommodate the leading protrusion of the front lever as it is being pushed into the slot by the closing motion of the toggle bracket. Therefore, according to one aspect of the invention, only a DLT cartridge that is placed correctly into the slot permits the closure of the toggle bracket of the I/O station. Accordingly, this feature provides immediate notice to an operator when he or she introduces the wrong cartridge or the wrong side of a DLT cartridge into a DLT I/O unit of an automated library.

According to another aspect of the invention, the toggle mechanism also includes a rear lever rotatably mounted behind the front lever on the rear post of each slot. The rear lever incorporates a trailing protrusion facing the slot and a shank slidably coupled to an elongated groove in the front lever. When the front lever is in closed position with the leading protrusion resting in the slot, the connection between the elongated groove and the shank causes the rear lever to be also closed with the trailing protrusion encroaching into the slot. When the toggle bracket is opened and the front lever rotates around the front post to an open position, the corresponding motion of the elongated groove causes the shank and rear lever to also rotate around the rear post to an open position whereby the trailing protrusion is withdrawn from the slot. As a result, both the leading and trailing protrusions are out and any appropriately sized cartridge can be introduced into the slot. When the toggle bracket is closed, by virtue of the groove/shank connection, the front and rear levers counter-rotate together causing both the leading and trailing protrusions to protrude into the cartridge slot. If an LTO cartridge or a DLT cartridge in the wrong position is in the slot, the counter-rotation of the front and rear levers is blocked by the leading and trailing protrusions because they both butt against the side of the cartridge in the slot. On the other hand, when a DLT cartridge is introduced in the correct orientation, the cavity in the side of the cartridge is able to accommodate both protrusions. Therefore, the trailing protrusion provides an additional safeguard to ensure that only a DLT cartridge that is placed correctly into the slot permits the closure of the toggle bracket.

According to yet another feature of the invention, the elevational position and the maximum degree of penetration of the leading and trailing protrusions are selected such that both protrusions clear the gap in the door hinge of the LTO cartridge when the cartridge is removed by the library robot from the interior side of the I/O station. Thus, only a properly positioned LTO cartridge can be successfully loaded into the exterior side of the I/O unit of the library and removed from the interior side by a library robot.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DESCRIPTION OF THE PREFERRED EMBODIMENT OF THE INVENTION

This invention consists of a new lockout mechanism that prevents the closure of the I/O station of an automated library when the wrong cartridge or an incorrectly oriented DLT cartridge is placed into a DLT receiving slot. Accordingly, the invention can be used advantageously to provide an immediate realization that a cartridge has been placed incorrectly into the slot when an operator is manually inserting cartridges into the I/O station.

For the purposes of this disclosure, a DLT format is defined as the magnetic-tape cartridge technology conforming to the specifications of the ECMA standard, which are all well known in the art. The terms front and rear are used throughout in connection with the structure of the DLT cartridge described herein to refer to the side containing the door and to its opposite side, respectively. Left and right refer to the cartridge lateral sides as they appear viewing the cartridge from its front side. The term bottom and top are used with reference to the side of each cartridge that contains the tape reel and hub for connection with a corresponding driving spindle in a drive and to its parallel opposite side, respectively. The terms high and height are used with reference to the direction between the bottom and top sides of the cartridge. The terms deep and depth are used with reference to the direction between the lateral sides and the interior of the cartridge. Finally, the terms open and closed, as used in describing the operation of the toggle bracket of an I/O station and the levers of the invention, refer to conditions as seen from outside the I/O station. In particular, the open position of the levers corresponds to the state wherein the leading and trailing protrusions are removed from the corresponding slot in the station.

Figure 1:
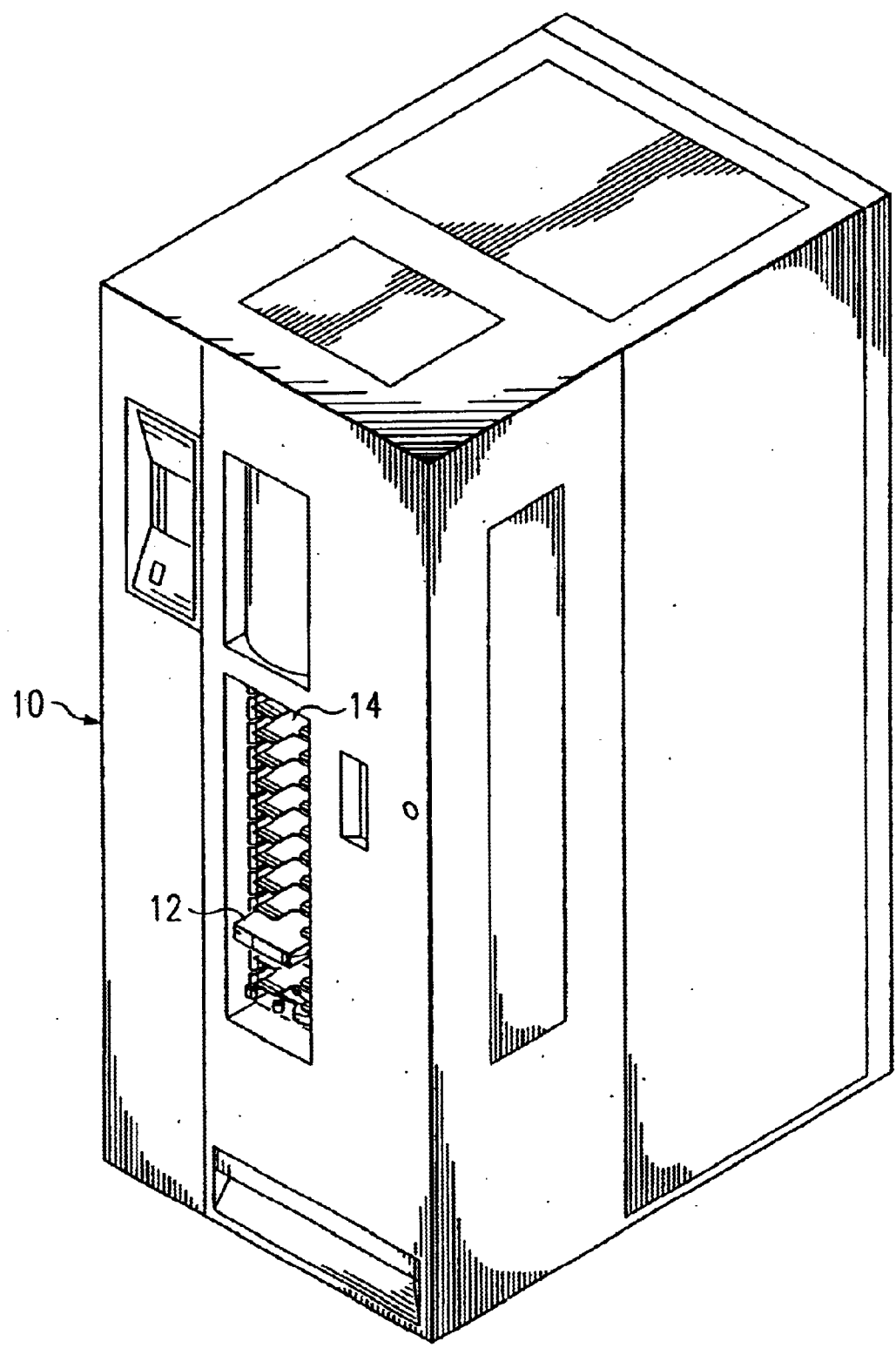
FIG. 1 is a perspective view of a conventional input/output station of an automated library for data cartridges.
Figure 2:
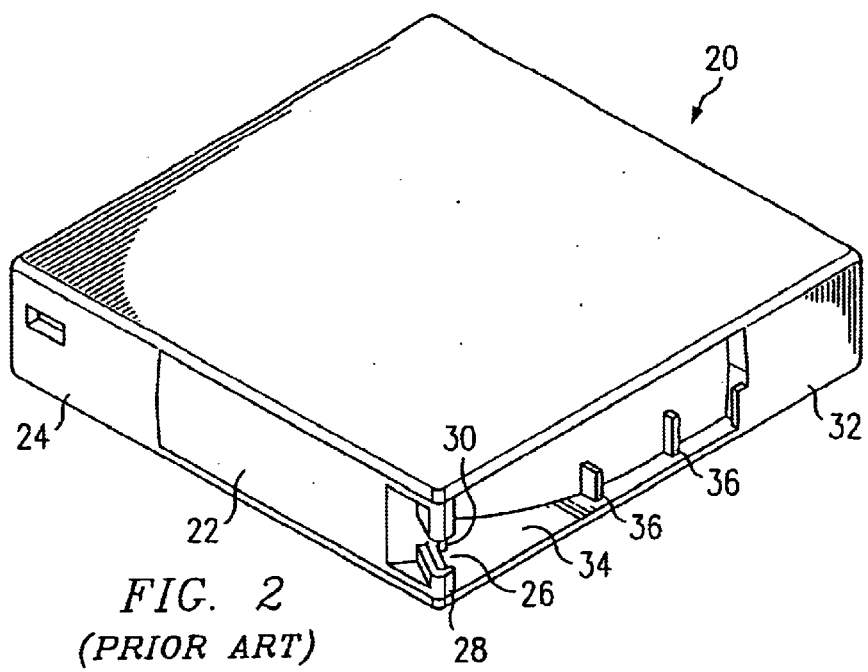
FIG. 2 is a perspective view of a DLT-format cartridge.
Figure 3:
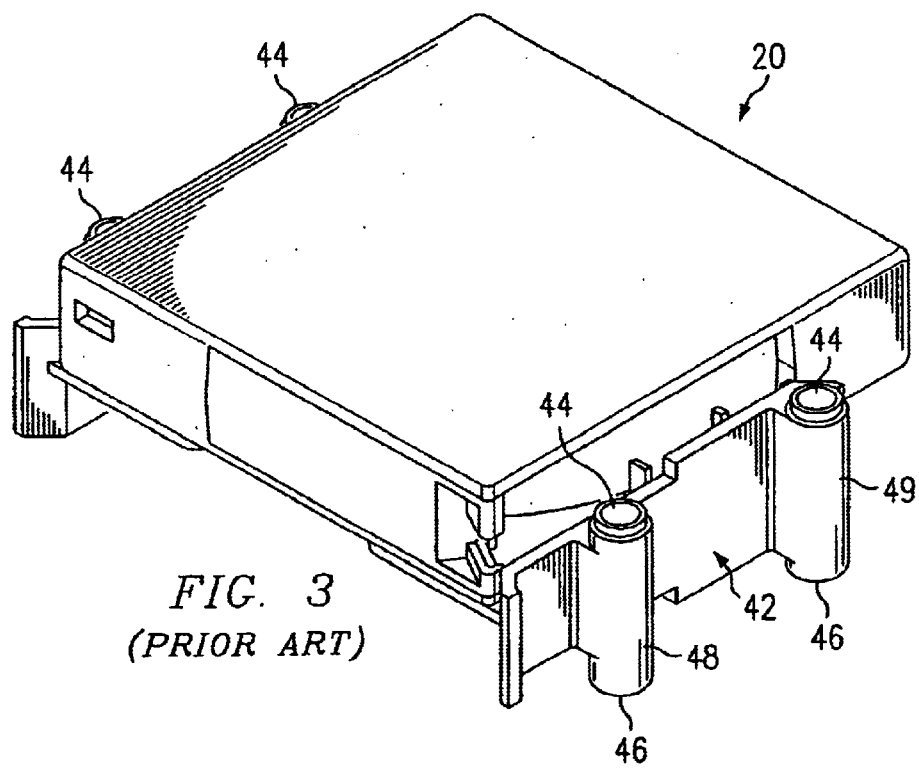
FIG. 3 is a perspective view of the DLT cartridge shown partially inserted into the receiving slot of a cell of the conventional I/O station of FIG. 1.
Figure 4:
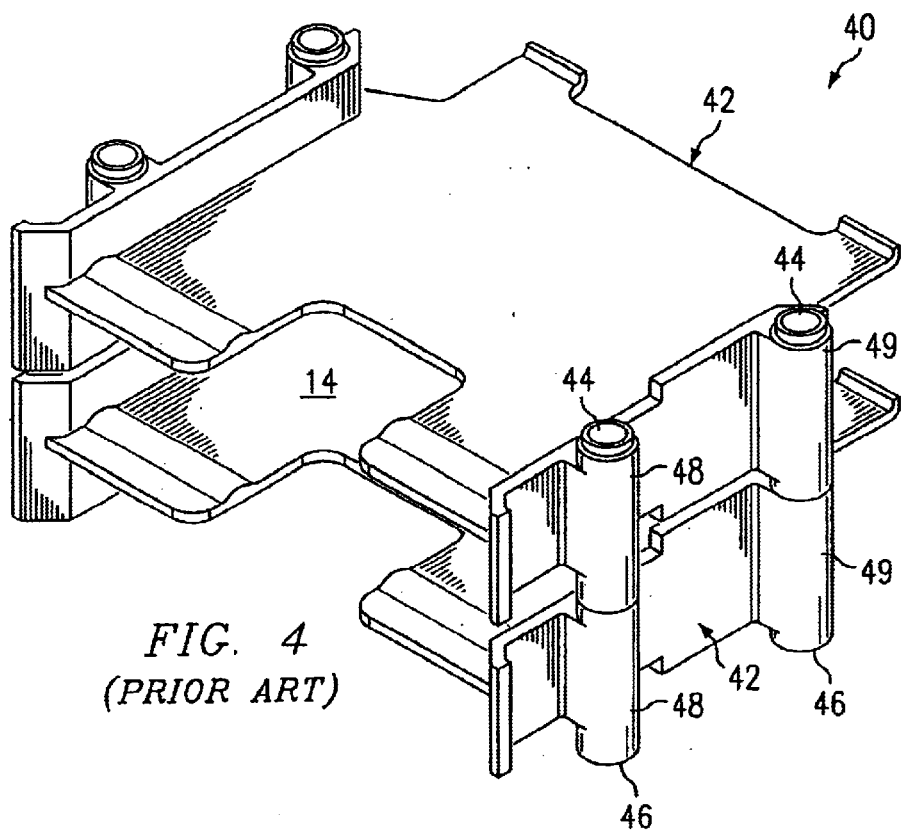
FIG. 4 is a perspective view of a cell of a conventional IBM 3584 Library's I/O station that consists of two half-cell modules stacked together to define a pass-through receiving slot designed to accommodate a DLT cartridge.
Figure 5:
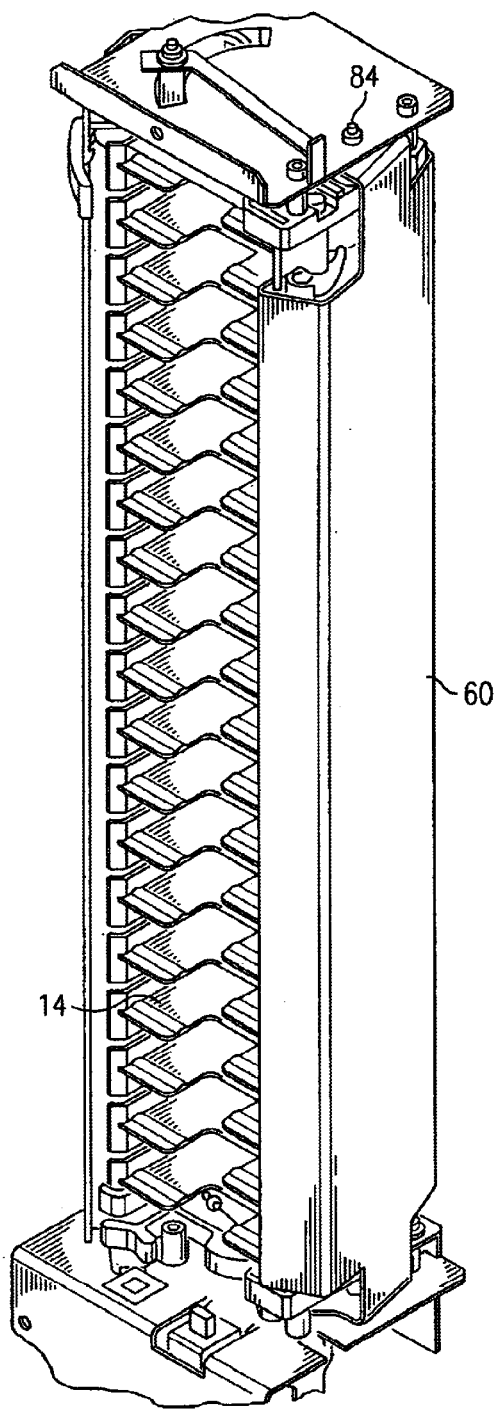
FIG. 5 is a partial perspective view of a stack of cells constructed using the modules of FIG. 4 and of a hinged toggle bracket provided to control access to the slots.

Referring to the drawings, wherein like parts are designated throughout with like numerals and symbols, FIG. 4 illustrates the modular structure of each cell of the I/O station of an IBM 3584 Library, which is used herein to illustrate the invention. Each cell 40 consists of a half-cell module 42 (see also FIG. 3) stacked over an identical component to define an individual slot 14 that conforms substantially to the shape and size of a DLT cartridge with tolerances that allow the easy and convenient insertion of the cartridge through the slot without excessive lateral gaps. Mating ends 44,46 in the lateral post 48,49 on each side of the modules 42 make it possible to construct multiple-cell I/O stations simply by stacking the modules vertically, as illustrated in FIG. 5.

Figure 6:
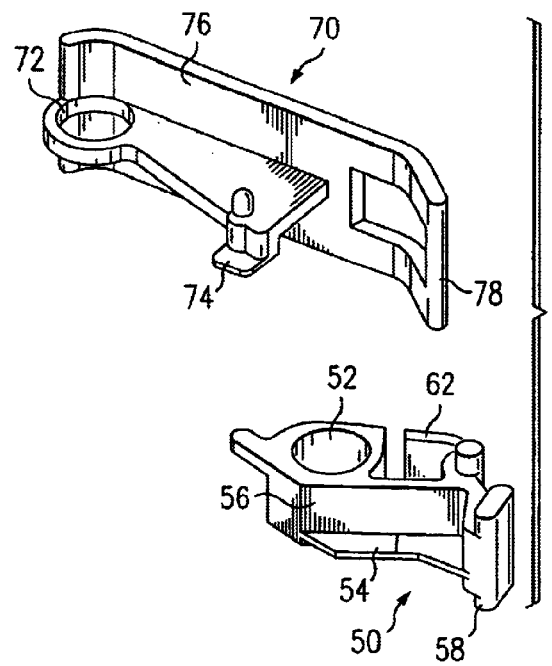
FIG. 6 is a perspective view of the front and rear levers of the toggle-protrusion lockout mechanism of the invention.

As shown in isolation in FIG. 6, the lockout mechanism of the invention consists of two separate components. A front lever 50 is provided with a front-hinge opening 52 adapted for journaled engagement by the mating ends 44,46 of the stacked front posts 48 of two half-cell modules 42. Thus, the hinged connection between the opening 52 and the posts 48 provides an axis of rotation for the pivoting action of the front lever 50. The lever includes a leading protrusion 54 extending laterally from the interior side 56 of the lever, such that the protrusion 54 encroaches into the space of the slot 14 when the front lever is rotated clockwise (viewed from the top). The front lever 50 also includes a front wing 58 designed to cooperate with a conventional access door or toggle bracket 60 (shown in FIGS. 5, 8 and 9) provided to control access to the cells of the I/O station. Specifically, as described in further detail below, the wing 58 engages the bracket 60 in its open position such that the bracket cannot be closed unless the front lever 50 is able to rotate with the bracket toward its closed position. Conversely, as the bracket 60 rotates from a closed to an open position, it engages the wing 58 and causes the front lever to open with the bracket. Finally, the exterior side of the front wing 50 features an elongated guide slot 62 capable of receiving and guiding a corresponding shank slidably mounted therethrough (also discussed below).

Figure 7:
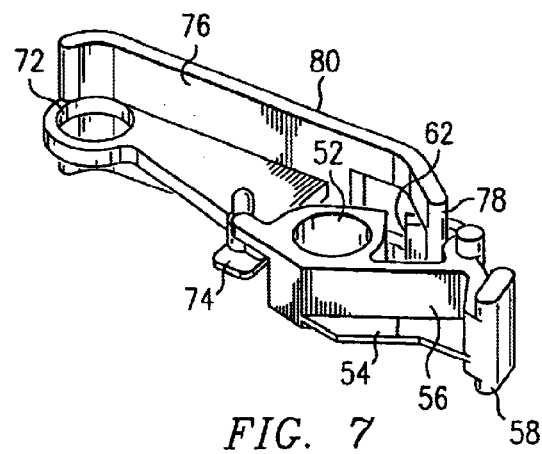
FIG. 7 is a perspective view of the front and rear levers of the invention connected in operative engagement and ready for installation on the lateral posts of a cell of an IBM 3584 input-output station.

The lockout mechanism of the invention also comprises a rear lever 70 (FIG. 6) that features a rear-hinge opening 72 adapted for journaled engagement by the mating ends 44,46 of the stacked rear posts 49 of two half-cell modules 42. Accordingly, the rear lever 70 is able to rotate around the rear post 49 of the cell 40. The lever 70 includes a trailing protrusion 74 that extends laterally from the interior side 76 of the lever and encroaches into the space of the slot 14 when the rear lever is rotated clockwise (viewed from the top). The rear lever 70 also includes a shank 78 at the distal end of a radial arm 80 adapted for slidable connection with the guide slot 62 of the front lever 50. As illustrated in FIG. 7, the front and rear levers 50,70 are coupled by inserting the shank 78 into the guide slot 62 through an opening 64 sized to permit the snug passage of the shank therethrough. In particular, the position of the slot 62 and shank 78 within the geometry of their respective structures is such that, when the front and rear levers are installed on their respective posts, the shank 78 slides longitudinally from one end of the slot 62 to the other as the levers rotate together around their respective hinge posts.

Figure 8:
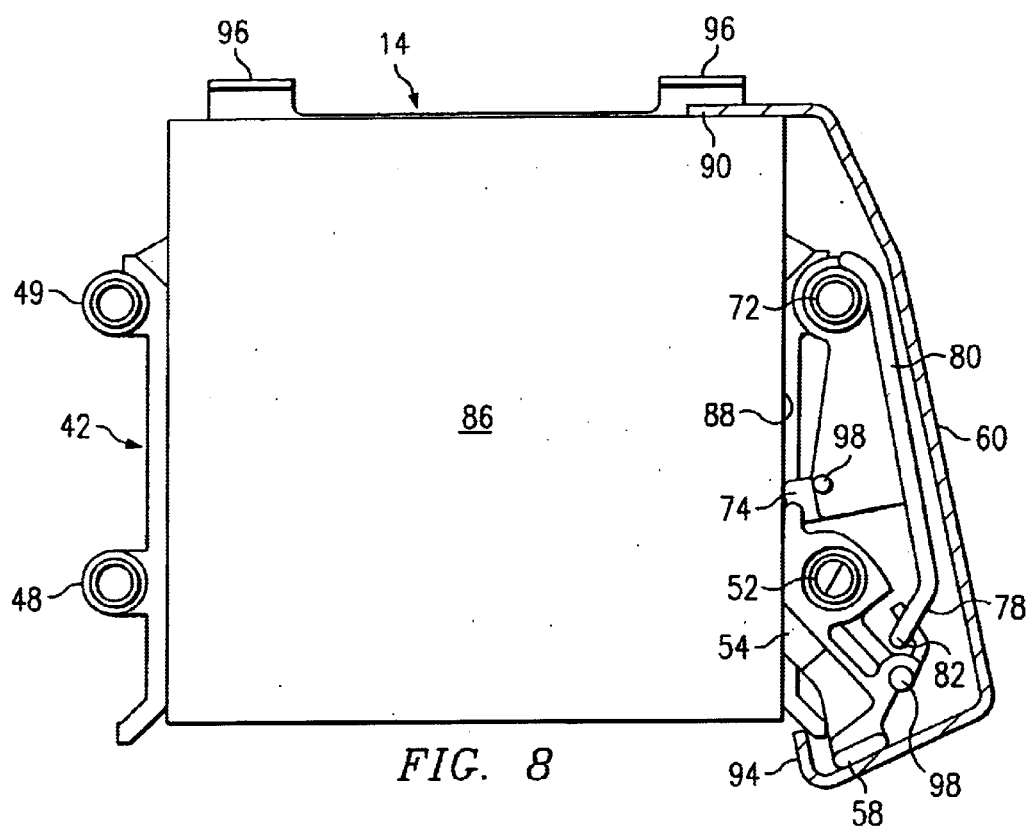
FIG. 8 is a top plan view of a half-cell module of the stack shown in FIG. 4 with the front and rear levers installed on the cell's lateral posts, a cartridge incorrectly placed into the cell, and a sectioned toggle bracket to show to relative position of each component when closure of the bracket is blocked by the binding action of the cartridge.

FIG. 8 illustrates in top plan view the front and rear levers of the invention in an open position after proper installation on the front and rear posts 48,49 of a stackable cell module 42 through their hinge openings 52,72. As clearly shown in the figure, the shank 78 is positioned toward the distal end 82 of the guide slot 62 when the levers 50,70 are open (that is, rotated counter-clockwise). In this open position, both the leading protrusion 54 and the trailing protrusion 74 rest outside the slot 14 defined by the combination of two half-cell modules 42 (see FIG. 4). As shown in FIG. 5, the toggle bracket 60 is mounted on the frame of the I/O station through a pair of vertical hinges 84 that allow the rotation between an open and a closed position of the bracket to gain and prevent access, respectively, to the slots 14. Accordingly, when the toggle bracket 60 (shown in section in FIG. 8) is opened to permit the unobstructed insertion of a tape cartridge into the slot 14, the front and rear levers 50,70 are also moved to an open position and the leading and trailing protrusions are removed from the slot. As such, any cartridge 86 sufficiently small to fit within the slot 14 can be introduced into the I/O station, but only a properly oriented DLT cartridge incorporates the cavity 34 that permits the subsequent closure of the toggle bracket 60. Any other cartridge (such as an LTO cartridge) or an incorrectly placed DLT cartridge will have a flat side 88 (as shown in FIG. 8) facing the levers 50,70. Thus, the leading and trailing protrusions 54,74 will butt against the side 88 of the cartridge and prevent the clockwise rotation of the levers. In turn, the clockwise rotation of the toggle bracket 60 is blocked by the wing 58 of the front lever 50 and the I/O station cannot be closed, thereby providing an indication to an operator that a cartridge is improperly oriented in a slot and is jamming the operation of the I/O station. Under these circumstances, as shown in FIG. 8, the toggle bracket 60 remains open and the pass-through progress of the cartridge 86 is also precluded by the rear edge 90 of the toggle bracket, which prevents access to the cartridge by an automated library picker operating from inside the I/O station.

Figure 9:
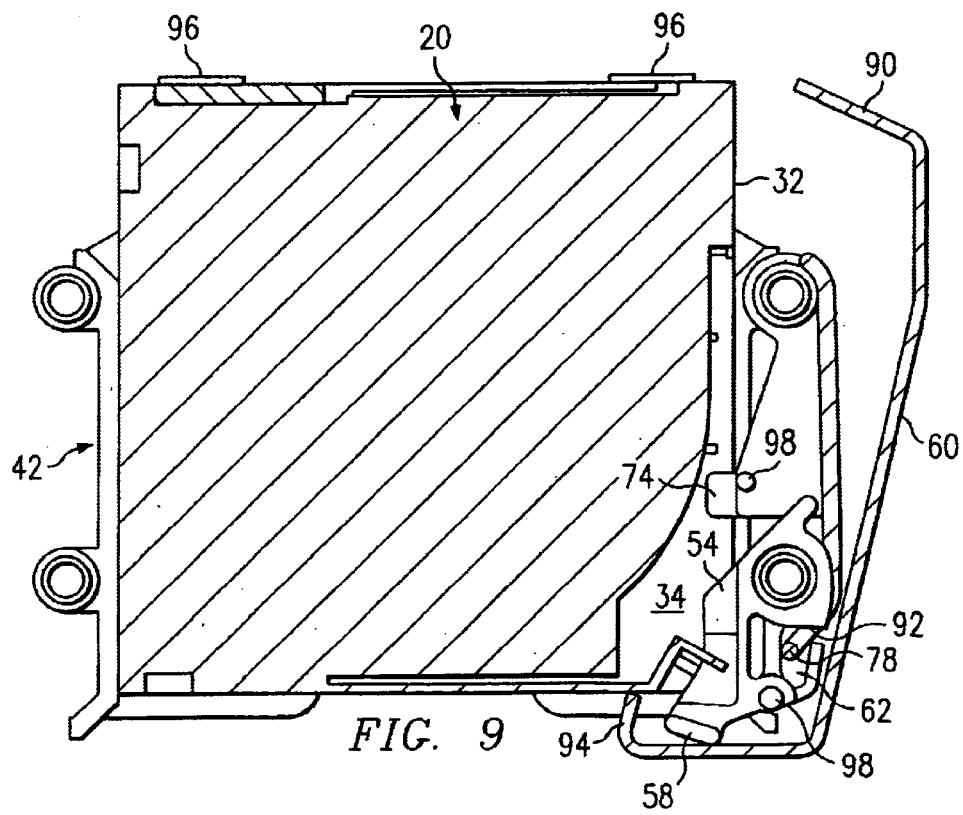
FIG. 9 is a top plan view of the half-cell module of FIG. 8 showing a sectioned DLT cartridge correctly placed into the cell, whereby the sectioned toggle bracket illustrates the relative position of each component when closure of the bracket allowed by the penetration of the leading and trailing protrusions of the invention into the slot within the clearance defined by the cavity in the right side of the cartridge.

When a DLT cartridge 20 is instead inserted correctly into the slot 14 of an I/O cell, as shown in the sectioned view of FIG. 9, the cavity 34 in the cartridge's right side 32 is available to accommodate the penetration of the leading protrusion 54 and the trailing protrusion 74 into the slot and the corresponding rotation of the front and rear levers. As the toggle bracket 60 closes, it pushes against the arm 80 of the rear lever 70, causing its clockwise rotation. In turn, the shank 78 pushes against the front lever 50 and causes its clockwise rotation as well while sliding toward the proximal end 92 of the guide slot 62. The correspondingly changing position of the wing 58 allows the continued rotation and closure of toggle bracket 60. As a result, the closed front edge 94 of the toggle bracket prevents subsequent access to the I/O slots from the exterior of the station while the rear edge 90 is removed from the pathway to the slot for accessing the cartridge 20 from inside the station. Retaining lips 96 in the bottom surface of each cell provide a reference position for the cartridge 20 within the slot 14, so that the cartridge rests in properly alignment for the automated operation of the library's picker from the interior of the I/O station. Stops 98 designed to butt against the exterior side of the modules 42 may be provided to limit the clockwise rotation of the levers.

As a result of the cooperative interaction between the front and rear levers 50,70 and the toggle bracket 60, the lockout mechanism of the invention is automatically opened for insertion of a cartridge into the slot 14 when the bracket is opened, regardless of whether or not the cartridge is inserted in the correct orientation. If it is not, the action of both leading and trailing protrusions 54,74 against the wrong side of the cartridge prevents the subsequent closure of the toggle bracket 60, thereby immediately providing a signal to the operator that the cartridge is oriented incorrectly. On the other hand, if a DLT cartridge is inserted correctly, the toggle bracket 60 closes effortlessly and all I/O slots become accessible from inside the station.

Figure 10:
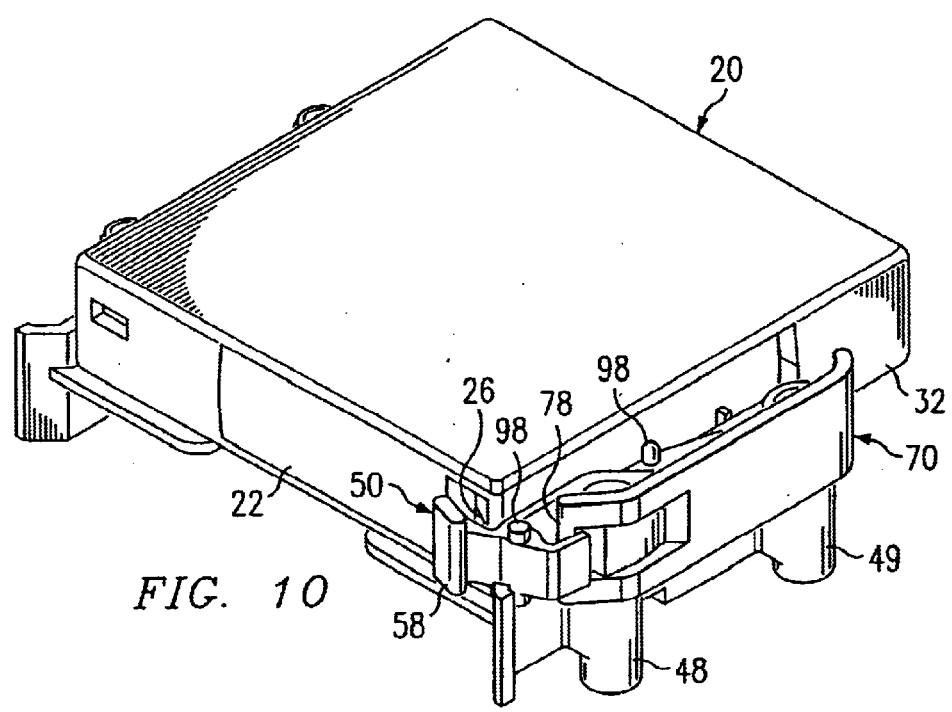
FIG. 10 is a perspective view of the half-cell of FIG. 9 showing the DLT cartridge fully inserted correctly into the slot and the corresponding penetration of the leading and trailing protrusions into the right side of the cartridge as a result of its correct orientation in the slot.

As also shown in FIG. 10, when a DLT cartridge is fully inserted correctly into the slot 14, the leading protrusion 54 of the front lever 50 is substantially contained within the gap 26 in the door hinge 28 of the cartridge and is therefore clear of any structural impediment that would prevent the extraction of the cartridge from inside the I/O station. Thus, the leading protrusion 54 does not constitute an impediment to the cartridge's forward motion to pass completely through the slot 14 when the cartridge is grabbed by the library's automated picker inside the I/O station. Inasmuch as the standards applicable to DLT cartridges prescribe that the gap 26 should span from 8 mm to 11 mm from the bottom of the cartridge and should be at least 6 mm deep, the leading protrusion 54 is preferably about 1 mm thick, it extends about 6 mm inward toward the I/O slot, and its section centerline is about 10 mm above the bottom surface of the slot 14. The front lever is mounted on the front right post 48 of each I/O cell 40 and is preferably sized so that its wing 58 extends approximately 32 mm from its axis of rotation. The trailing protrusion 74 is preferably about 1 mm thick, it extends about 5 mm inward toward the I/O slot, and its section centerline is about 9 mm above the bottom surface of the slot, so that it can also pass through the gap 26 in the DLT cartridge when it is removed from inside the I/O station. The rear lever is mounted on the rear right post 49 of each I/O cell 40 and has a radial arm 80 that extends preferably about 62 mm from its axis or rotation. The guide slot 62 is preferably about 11 mm long and is adapted to cooperate with a slidably mounted shank 78 incorporated into the distal end of a radial arm 80.

Thus, a new design for a lockout mechanism is provided that is suitable for implementation within a conventional I/O station of an automated library. The device of the invention prevents the closure of the I/O station's toggle bracket when any cartridge is introduced other than a DLT cartridge that is oriented correctly. Furthermore, when the DLT cartridge is inserted correctly, the device allows its unimpeded passage through the I/O slot for automated handling by library robots. The lockout levers of the invention are also advantageously designed for installation between each pair of the modular components used to construct a conventional IBM 3584 I/O station. Therefore, the position of each lockout lever is inherently referenced to its corresponding pair of cell components, thereby avoiding the typical alignment problems associated with cumulative errors present when a single reference point is used. Another advantage of the invention is the total absence of interaction between the cartridge and the lockout levers if an LTO cartridge is inserted properly into the I/O station. Yet another advantage is the totally mechanical implementation of the invention, with no need for electrical components or computerized control for carrying out its function.

Various changes in the details, steps and components that have been described may be made by those skilled in the art within the principles and scope of the invention herein illustrated and defined in the appended claims. Therefore, while the invention has been shown and described in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A lockout mechanism for preventing incorrect loading of a digital linear tape cartridge into a slot of a dedicated cell in an input/output station of a device, said cartridge having a right side with a cavity and a door hinge with a gap, comprising:

a front lever with a front wing, a front-hinge member rotatably mounted on a front side of the cell, and a leading protrusion extending into the slot when the front wing is rotated toward the slot;

a rear lever with a radial arm, a rear-hinge member rotatably mounted on a rear side of the cell, and a trailing protrusion extending into the slot when the radial arm is rotated toward the slot;

means for coupling the front and rear levers so that a rotation of the front lever produces a corresponding rotation of the rear lever; and means for preventing closure of a toggle bracket provided to control access to the input/output station when said leading protrusion is out of the slot;

wherein the leading protrusion and the trailing protrusion are sized to fit within a clearance defined by said cavity and said gap in the cartridge when the leading and trailing protrusions are fully extended into the slot and the cartridge is passed through the slot.

2. The lockout mechanism of claim 1, wherein said means for coupling the front and rear levers includes an elongated slot in the front lever and a shank in said radial arm slidably mounted in the slot.

3. The lockout mechanism of claim 1, wherein said means for preventing closure of the toggle bracket includes a binding engagement of the toggle bracket by said radial arm in the rear lever when the leading protrusion is prevented from penetrating into the slot by a cartridge incorrectly placed therein.

4. The lockout mechanism of claim 1, wherein said front wing of the front lever cooperates with the toggle bracket of the input/output station to push the leading protrusion of the front lever fully into the slot when a front side of the toggle bracket is closed.

5. The lockout mechanism of claim 1, further including a stop in the front lever which butts against an outer surface of the cell and thereby limits the penetration of the leading protrusion into the slot when a front side of the toggle bracket is closed.

6. The lockout mechanism of claim 1, wherein said device is a computer library.

7. The lockout mechanism of claim 1, wherein said cell includes two half-cell modular components with mating lateral posts and each of said front-hinge and rear-hinge members consists of an opening adapted for journaled engagement with one of said lateral posts.

8. The lockout mechanism of claim 1, wherein said leading protrusion is about 1 mm thick, extends about 6 mm inward toward the slot, and has a section centerline that is about 10 mm above the bottom surface of the slot.

9. The lockout mechanism of claim 1, wherein said trailing protrusion is about 1 mm thick, extends about 5 mm inward toward the slot, and has a section centerline is about 9 mm above the bottom surface of the slot.

10. The lockout mechanism of claim 1, wherein said means for coupling the front and rear levers includes an elongated slot in the front lever and a shank in said radial arm slidably mounted in the slot; said front wing of the front lever cooperates with the toggle bracket of the input/output station to push the leading protrusion of the front lever fully into the slot when a front side of the toggle bracket is closed; said cell includes two half-cell modular components with mating lateral posts and each of said front-hinge and rear-hinge members consists of an opening adapted for journaled engagement with one of said lateral posts; said leading protrusion is about 1 mm thick, extends about 6 mm inward toward the slot, and has a section centerline that is about 10 mm above the bottom surface of the slot; and said trailing protrusion is about 1 mm thick, extends about 5 mm inward toward the slot, and has a section centerline is about 9 mm above the bottom surface of the slot.

11. An input/output station with a pass-through cell for exchanging digital linear tape cartridges with a device, wherein each cartridge has a right side with a cavity and a door hinge with a gap, said station comprising:
   a receiving slot defined by said cell of the station;
   a front lever with a front wing, a front-hinge member rotatably mounted on a front side of the cell, and a leading protrusion extending into the slot when the front wing is rotated toward the slot;
   a rear lever with a radial arm, a rear-hinge member rotatably mounted on a rear side of the cell, and a trailing protrusion extending into the slot when the radial arm is rotated toward the slot;
   means for coupling the front and rear levers so that a rotation of the front lever produces a corresponding rotation of the rear lever;
   a toggle bracket operable between an open position, wherein access to the slot from outside the input/output station is permitted, and a closed position, wherein access to the slot from outside the input/output station is denied; and
   means for preventing closure of the toggle bracket when said leading protrusion is out of the slot;
   wherein the leading protrusion and the trailing protrusion are sized to fit within a clearance defined by said cavity and said gap in the cartridge when the leading and trailing protrusions are fully extended into the slot and the cartridge is passed through the slot.

12. The input/output station of claim 11, wherein said means for coupling the front and rear levers includes an elongated slot in the front lever and a shank in said radial arm slidably mounted in the slot.

13. The input/output station of claim 11, wherein said means for preventing closure of the toggle bracket includes a binding engagement of the toggle bracket by said radial arm in the rear lever when the leading protrusion is prevented from penetrating into the slot by a cartridge incorrectly placed therein.

14. The input/output station of claim 11, wherein said front wing of the front lever cooperates with the toggle bracket to push the leading protrusion of the front lever fully into the slot when a front side of the toggle bracket is closed.

15. The input/output station of claim 11, further including a stop in the front lever which butts against an outer surface of the cell and thereby limits the penetration of the leading protrusion into the slot when a front side of the toggle bracket is closed.

16. The input/output station of claim 11, wherein said device is a computer library.

17. The input/output station of claim 11, wherein said cell includes two half-cell modular components with mating lateral posts and each of said front-hinge and rear-hinge members consists of an opening adapted for journaled engagement with one of said lateral posts.

18. The input/output station of claim 11, wherein said leading protrusion is about 1 mm thick, extends about 6 mm inward toward the slot, and has a section centerline that is about 10 mm above the bottom surface of the slot.

19. The input/output station of claim 11, wherein said trailing protrusion is about 1 mm thick, extends about 5 mm inward toward the slot, and has a section centerline is about 9 mm above the bottom surface of the slot.

20. The input/output station of claim 11, wherein said means for coupling the front and rear levers includes an elongated slot in the front lever and a shank in said radial arm slidably mounted in the slot; said front wing of the front lever cooperates with the toggle bracket to push the leading protrusion of the front lever fully into the slot when a front side of the toggle bracket is closed; said cell includes two half-cell modular components with mating lateral posts and each of said front-hinge and rear-hinge members consists of an opening adapted for journaled engagement with one of said lateral posts; said leading protrusion is about 1 mm thick, extends about 6 mm inward toward the slot, and has a section centerline that is about 10 mm above the bottom surface of the slot; and said trailing protrusion is about 1 mm thick, extends about 5 mm inward toward the slot, and has a section centerline is about 9 mm above the bottom surface of the slot.

21. An automated library for storage of digital linear tape cartridges having a right side with a cavity and a door hinge with a gap, comprising:
   an input/output station with at least one pass-through cell for exchanging digital linear tape cartridges with the library;
   a receiving slot defined by each of said at least one cell of the station;
   a front lever with a front wing, a front-hinge member rotatably mounted on a front side of the cell, and a leading protrusion extending into the slot when the front wing is rotated toward the slot;
   a rear lever with a radial arm, a rear-hinge member rotatably mounted on a rear side of the cell, and a trailing protrusion extending into the slot when the radial arm is rotated toward the slot;

means for coupling the front and rear levers so that a rotation of the front lever produces a corresponding rotation of the rear lever;

a toggle bracket operable between an open position, wherein access to the slot from outside the input/output station is permitted, and a closed position, wherein access to the slot from outside the input/output station is denied; and means for preventing closure of the toggle bracket when said leading protrusion is out of the slot;

wherein the leading protrusion and the trailing protrusion are sized to fit within a clearance defined by said cavity and said gap in the cartridge when the leading and trailing protrusions are fully extended into the slot and the cartridge is passed through the slot.

22. The automated library of claim 21, wherein said means for coupling the front and rear levers includes an elongated slot in the front lever and a shank in said radial arm slidably mounted in the slot.

23. The automated library of claim 21, wherein said means for preventing closure of the toggle bracket includes a binding engagement of the toggle bracket by said radial arm in the rear lever when the leading protrusion is prevented from penetrating into the slot by a cartridge incorrectly placed therein.

24. The automated library of claim 21, wherein said front wing of the front lever cooperates with the toggle bracket to push the leading protrusion of the front lever fully into the slot when a front side of the toggle bracket is closed.

25. The automated library of claim 21, further including a stop in the front lever which butts against an outer surface of the cell and thereby limits the penetration of the leading protrusion into the slot when a front side of the toggle bracket is closed.

26. The automated library of claim 21, wherein said cell includes two half-cell modular components with mating lateral posts and each of said front-hinge and rear-hinge members consists of an opening adapted for journaled engagement with one of said lateral posts.

27. The automated library of claim 21, wherein said leading protrusion is about 1 mm thick, extends about 6 mm inward toward the slot, and has a section centerline that is about 10 mm above the bottom surface of the slot.

28. The automated library of claim 21, wherein said trailing protrusion is about 1 mm thick, extends about 5 mm inward toward the slot, and has a section centerline is about 9 mm above the bottom surface of the slot.

29. The automated library of claim 21, wherein said means for coupling the front and rear levers includes an elongated slot in the front lever and a shank in said radial arm slidably mounted in the slot; said front wing of the front lever cooperates with the toggle bracket to push the leading protrusion of the front lever fully into the slot when a front side of the toggle bracket is closed; said cell includes two half-cell modular components with mating lateral posts and each of said front-hinge and rear-hinge members consists of an opening adapted for journaled engagement with one of said lateral posts; said leading protrusion is about 1 mm thick, extends about 6 mm inward toward the slot, and has a section centerline that is about 10 mm above the bottom surface of the slot; and said trailing protrusion is about 1 mm thick, extends about 5 mm inward toward the slot, and has a section centerline is about 9 mm above the bottom surface of the slot.

30. A lockout mechanism for preventing incorrect loading of a digital linear tape cartridge into a slot of a dedicated cell in an input/output station of a device, said cartridge having a right side with a cavity and a door hinge with a gap, comprising:

a lever with a wing, a hinge member rotatably mounted on a side of the cell, and a protrusion extending into the slot when the wing is rotated toward the slot;

means for preventing closure of a toggle bracket provided to control access to the input/output station when said protrusion is out of the slot;

wherein the protrusion is sized to fit within a clearance defined by said cavity and said gap in the cartridge when the protrusion is fully extended into the slot and the cartridge is passed through the slot.

31. The lockout mechanism of claim 30, wherein said wing of the lever cooperates with the toggle bracket of the input/output station to push the protrusion of the lever fully into the slot when a front side of the toggle bracket is closed.

32. The lockout mechanism of claim 30, further including a stop in the lever which butts against an outer surface of the cell and thereby limits the penetration of the protrusion into the slot when a front side of the toggle bracket is closed.

33. The lockout mechanism of claim 30, wherein said device is a computer library.

* * * * *